United States Patent

Stademann et al.

[11] Patent Number: 5,930,249
[45] Date of Patent: Jul. 27, 1999

[54] PROCESS AND ROUTING SYSTEM FOR DYNAMIC TRAFFIC CONTROL IN A COMMUNICATION NETWORK

[75] Inventors: Rainer Stademann, Egmating; Karl Gehlhaus, München, both of Germany

[73] Assignee: Siemens Aktiengesellschaft, Munich, Germany

[21] Appl. No.: 08/776,561

[22] PCT Filed: Aug. 3, 1995

[86] PCT No.: PCT/EP95/03098

§ 371 Date: Jan. 31, 1997

§ 102(e) Date: Jan. 31, 1997

[87] PCT Pub. No.: WO96/04757

PCT Pub. Date: Feb. 15, 1996

[30] Foreign Application Priority Data

Aug. 3, 1994 [EP] European Pat. Off. ............. 94112147

[51] Int. Cl.⁶ .................................................. H04J 1/16
[52] U.S. Cl. .......................................... 370/351; 370/227
[58] Field of Search ..................................... 370/351, 216, 370/217, 218, 221, 225, 227, 228, 407, 408, 411, 352, 389; 340/827, 825.01; 395/181; 379/221

[56] References Cited

U.S. PATENT DOCUMENTS 5,323,144  6/1994  Imai et al. ............................. 370/227
5,343,464  8/1994  Iino et al. .............................. 370/227

FOREIGN PATENT DOCUMENTS 0 229 494  7/1987  European Pat. Off. ..
0 372 270  6/1990  European Pat. Off. ..
0 376 556  7/1990  European Pat. Off. ..
0 490 446  6/1992  European Pat. Off. ..

OTHER PUBLICATIONS

Proceedings of the 10th International Teletraffic Congress, vol. 1, No. 32.3, Jun. 1983, Dynamic Routing for Intercity Telephone Networks, Cameron et al, pp. 1–8.

IEEE Communications Magazine, vol. 25, No. 9, Sep. 1987, A Survey of Dynamic Routing Methods for Circuit–Switched Traffic, Hurley et al, pp. 13–21.

IEEE Transactions On Systems, Man and Cybernetics, vol. 15, No. 6, Nov. 1985, A Simulation Study of Advanced Routing Methods in a Multipriority Telephone Network, Akselrod et al, pp. 730–736.

IEEE Communications Magazine, vol. 28, No. 10, Oct. 1990, Distributed Dynamic Routing Schemes, Key et al, pp. 54–58, 63–64.

Electronics and Communications in Japan, Part I, vol. 72, No. 11, Nov. 1989, Comparison of Stability for Various Routing–Procedures in Circuit–Switched Networks, Yokohira et al, pp. 43–51.

*Primary Examiner*—Dang Ton
*Attorney, Agent, or Firm*—Hill & Simpson

[57] ABSTRACT

The dynamic routing of a communication network is to adapt itself to the respective traffic load in the network in a way which optimizes network throughput. The routing according to the invention solves this problem by a route fan for holding alternate routes for the overflow traffic, an alternate route previously contained in the route fan being removed from the route fan without replacement as soon as it is established that it is no longer available.

16 Claims, 1 Drawing Sheet

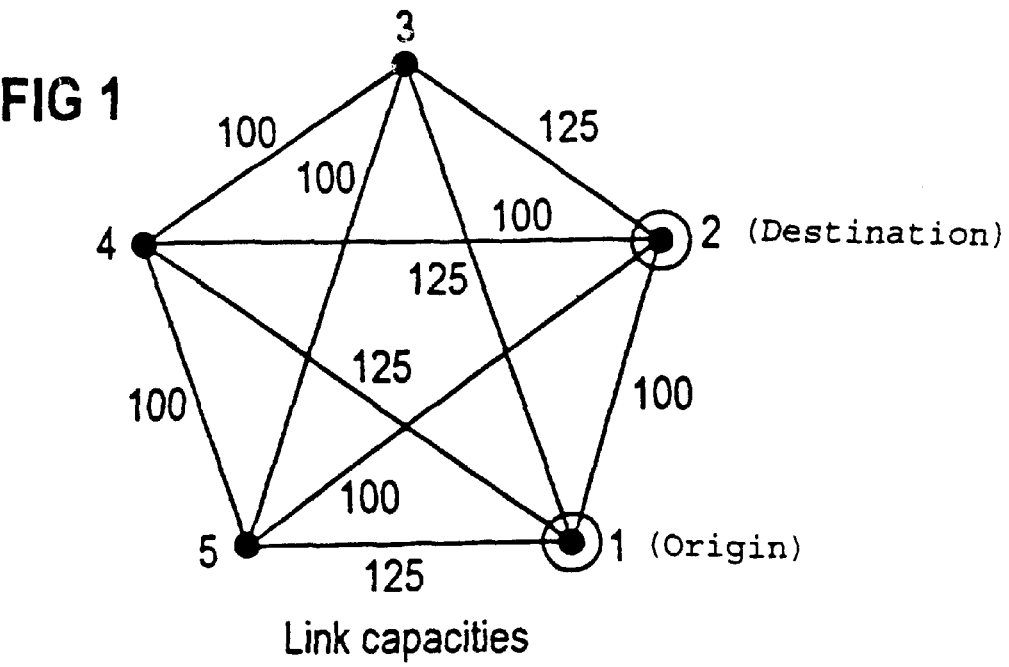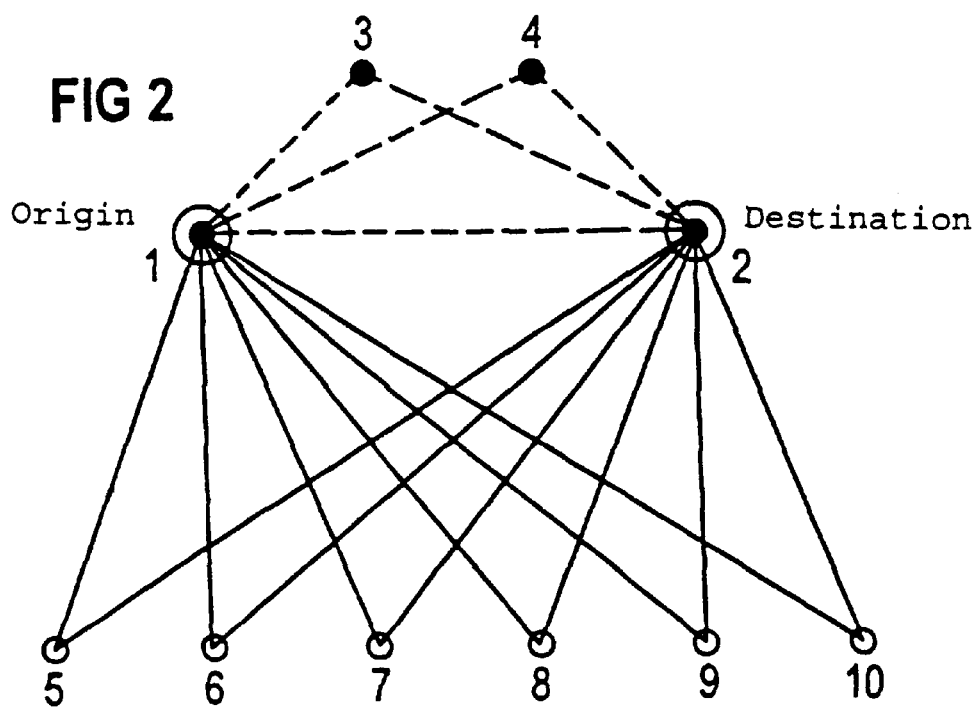

PROCESS AND ROUTING SYSTEM FOR DYNAMIC TRAFFIC CONTROL IN A COMMUNICATION NETWORK

BACKGROUND OF THE INVENTION

The invention relates to a process and a routing system for dynamic traffic control in a communication network.

Nonhierarchically organized, line-switching communication networks require dynamic routing which adapts itself to the respective traffic load in the network in a way which optimizes network throughput. This includes in particular that unbalanced load situations have to be eliminated by the routing.

As in the case of conventional routing in hierarchical networks, with dynamic routing it is also first of all attempted to set up connections via one or more of the planned routes, which are usually direct routes. If this is not possible, because for example all the junction trunk groups of the direct route have reached their capacity, the overflow traffic is assigned to alternate routes.

In the selection of alternate routes, there is the fundamental difference between dynamic routing and conventional routing. In the case of conventional routing, administratively specified alternate routes are searched in strict sequence for an idle line or an idle channel ("fixed alternate routing"). As a result, the routing can react only very unsatisfactorily to unplanned, unusual load situations.

In the case of dynamic routing, overflow traffic occurring if assigned to one or more active alternate routes. This active alternate route or these active alternate routes are not fixed, but are selected in a way corresponding to the respective process for dynamic routing or are even newly determined in the case of each call. The advantages of dynamic routing are its robustness and flexibility with respect to unbalanced load situations in the network, which may occur for example due to loads varying at different times (localized high volume of traffic in cases of disasters, for example) and network degradation (failures of line trunk groups, failures of switching units). In addition, uncertainties in network planning can be compensated better.

European Patent EP-B1 0 229 494 discloses a decentralized process for dynamic routing which assigns overflow traffic to an alternate route until said route is no longer available, i.e. until either the primary link of the alternate route is busy, or the origin node receives a clearing message because a transit node is blocked. In this case, the existing alternate route is replaced cyclically or (pseudo)randomly by another alternate route. In another version of the process, the overflow traffic is distributed over a group of a plurality of alternate routes and, if it becomes unavailable, one alternate route is replaced by another alternate route.

This process has the disadvantage that even highly loaded alternate routes keep receiving overflow traffic, even if alternate routes with still low loading are available and the overflow traffic occurring is not offered equally to all the routes with low loading.

European Patent Application 0 372 270 A2 discloses a routing process. According to this process, if it is established that an alternate route is not available, it is briefly excluded from the route fan, i.e. an alternate route is re-included in the route fan after the elapse of a short period of time, which is also varied for each alternate route. The route fan is also reinitialized in the long term (updated), i.e. if the number of alternate routes contained in it drops below a given number.

SUMMARY OF THE INVENTION

The invention is based on the object of distributing the overflow traffic equally among alternate routes with as low a loading as possible.

In general terms the present invention is a process for dynamic traffic control in a communication network. Calls between an origin switching node and a destination switching node are initially offered to one or more preferred routes (planned routes). In the event that none of the planned routes is available, calls are offered to alternate routes, which are contained in a route fan, on the basis of a specific selection scheme. An alternate route previously contained in the route fan is removed from the route fan as soon as it is established that it is no longer available. The route fan is reinitialized if the number of alternate routes contained in the route fan drops below a specific value. The removal of an alternate route from the route fan is not restricted to an individual time for this alternate route. The route fan is, furthermore, reinitialized if a specific time condition is satisfied.

Advantageous developments of the present invention are as follows.

The route fan is reinitialized on the basis of a command from a network-centralized traffic management system or the network operator.

During an initialization or reinitialization, the route fan is assigned all possible alternate routes.

During an initialization or reinitialization, the route fan is assigned a subset of the possible alternate routes, which is determined on the basis of the criterion of the traffic loading or the free capacity of the alternate routes by the origin switching node or a network-centralized traffic management system.

A call is offered only to a single alternate route before it is terminated because of non-availability of the latter.

In the specific selection schemes the alternate routes are selected from the route fan in a randomly controlled or pseudorandomly controlled or cyclically rotating manner.

Each alternate route selected from the route fan for the overflow traffic is offered a given number of overflowing calls before moving on to the next alternate route according to the selection schema.

The present invention is also a routing system for dynamic traffic control in a switching node processor of a communication network. The system offers calls between an origin switching node and a destination switching node initially to one or more preferred routes (planned routes). In the event that none of the planned routes is available, offers calls to alternate routes, which are contained in a route fan, on the basis of a specific selection scheme. The system removes an alternate route previously contained in the route fan from the route fan as soon as it establishes that it is no longer available. the system reinitializes the route fan if the number of alternate routes contained in the route fan drops below a specific number. The system does not restrict the removal of an alternate route from the route fan to an individual time for this alternate route. The system reinitializes the route fan furthermore if a specific time condition is satisfied.

Advantageous developments of the system of the present invention are as follows.

The system reinitializes the route fan on the basis of a command from a network-centralized traffic management system or the network operator.

During an initialization or reinitialization the system assigns the route fan all possible alternate routes.

During an initialization or reinitialization, the system assigns the route fan a subset of the possible alternate routes, which is determined on the basis of the criterion of the traffic loading or the free capacity of the alternate routes by the routing system itself or a network-centralized traffic management system.

The system offers a call to a single alternate route before it is terminated in the case of non-availability of the latter.

In the specific selection scheme the alternate routes are selected from the route fan in a randomly controlled or pseudorandomly controlled or cyclically rotating manner.

The system offers each alternate route selected from the route fan for the overflow traffic a given number of overflowing calls before it offers the next alternate route according to the selection schema.

Non-replacement of an alternate route taken out of the route fan because of non-availability prevents highly loaded alternate routes from being offered again for the overflow traffic at too early a stage after they have been withdrawn, and consequently from receiving traffic again although alternate routes with still low loading are available.

Furthermore, the process according to the invention is less time-intensive, since it is not necessary every time after the non-availability of an alternate route has been established for a replacement alternate route to be determined.

In a development of the invention as claimed in claim 3, the route fan of the active alternate routes after each (re) initialization comprises all the alternate routes possible for the origin-destination relationship. As a result, the (re) initialization is very uncomplicated.

In a further development of the invention as claimed in claim 4, the route fan of the active alternate routes after each (re)initialization comprises a genuine subset of the alternate routes possible for the origin-destination relationship. Alternate routes of which it is known a priori that they currently or permanently have little free capacity, can consequently be excluded from the route fan already during the initialization of the process.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 depicts a diagram of a small fully intermeshed network; and

FIG. 2 depicts a constantly changing load situation in the network.

DESCRIPTION OF THE PREFERRED EMBODIMENTS

FIG. 1 shows a diagram of a small fully intermeshed network having five network switching nodes and the corresponding capacities of route sections (links) between the network nodes, a link comprising at least one junction trunk group.

It shall now be assumed that the switching node 1 has a call for switching node 2, but the direct route between the two switching nodes is not available.

It shall further be assumed that, after its initialization for the first time or after a reinitialization, the initial route fan, i.e. the fan of the active alternate routes, comprises all the two-link alternate routes possible for the origin-destination relationship. This being assumed, the route fan of the alternate routes for the origin-destination relationship between switching node 1 and switching node 2 comprises three alternate routes, namely the two-link alternate routes via the switching nodes 3, 4 and 5.

It shall further be assumed that the overflow traffic is cyclically distributed by the routing system equally among these active alternate routes, to be precise in the sequence of transit nodes 3, 4 and 5.

The assumptions being made, the routing system initially checks at the switching node 1 whether the active alternate route via transit node 3 is available, i.e. whether it has free lines or channels which can be seized (in the following, reference will be made only to "channels").

To be able to check this, the routing system stores in switching node 1 the capacity of the link between switching nodes 1 and 3, namely 125 channels, and the trunk reservation parameter associated with this link, which in this case is, for example, 10. The routing system additionally stores the number of channels currently being used. The link between switching nodes 1 and 3 is then available from the viewpoint of the routing system for overflow traffic whenever the sum of the channels being used and the trunk reservation parameter is less than 125 (the trunk reservation ensures the stability of a routing process in the high-load range).

If the first link is available, the switching node 1 initially sets up the connection up to the switching node 3. Then, before continuing to set up the connection to the destination switching node 2, the routing system of the switching node 3 checks the availability of the second link, in that it checks whether the sum of busy channels plus trunk reservation parameter is less than the capacity of the second link (for this purpose, the routing system of the switching node 3 knows the capacity of the link between switching nodes 3 and 2, namely 125 channels, and also the trunk reservation parameter of this link, namely 10 channels, and the number of channels of this link currently being used).

If the second link of the active alternate route is also available, the connection from the transit node 3 to the destination node 2 is set up.

If the transit node 3 establishes that the link to the destination node 2 is not available, transit node 3 clears the connection section to the origin node 1 with a specially tagged checkback message. The routing system of the origin node 1 then removes the alternate route via transit node 3 from the route fan for destination node 2.

In the abovementioned case of successful switching of the call via transit node 3, in the case of the next call for the switching node 2 and non-availability of the direct route, it is once again attempted to direct the call via the transit node 3. Only in the case of a further call is it then cyclically changed, i.e. the call is directed via the next active alternate route, i.e. the active alternate route via transit node 4. As a result, it is possible to use short-term autocorrelations in the incoming traffic on the second link, which increase the probability that, directly after successfully setting up a connection, a further connection can be set up on the same route.

In the case of the exemplary embodiment, the traffic overflowing from the direct route is thus assigned cyclically in rotation to the active alternate routes. In this way, each of the active alternate routes is assigned two successively following calls overflowing from the direct route.

As soon as the routing system establishes when carrying out the routing process that an active alternate route of the route fan is no longer available, this route is removed from the route fan, but is not replaced by another alternate route (removal of the alternate route from the route fan may also be understood as meaning that the alternate route concerned is marked as unavailable by an identifier). The non-replacement of the removed alternate route in the route fan avoids an alternate route with possibly few free lines being re-included in the route sequence by replacing another alternate route which has become no longer available, and consequently traffic being lost on the newly included alternate route.

If the routing system establishes that it has offered (assigned) a call to an alternate route with a busy first route section, the active alternate route is changed and the call is offered to the cyclically next active alternate route. If, here too, the first route section is busy, the alternate route is changed once more. Altogether, as a maximum, a given number of active alternate routes to available channels in the first route section are checked for a call before the call is lost. A call which, with an available first route section, encounters an unavailable second route section is immediately lost in the case of the exemplary embodiment (no "re-routing"). However, the invention may also be realized with "re-routing".

On average, alternate routes with few free channels become unavailable more quickly than alternate routes with many free channels. Thus, on average, the latter remain longer in the route fan of the active alternate routes and consequently also receive more overflow traffic.

Since the overflow traffic is distributed among all the active alternate routes remaining in the route fan, the alternate routes remain available for longer than in the case of a process which operates with a fixed number of active alternate routes.

Only when no active alternate route at all exists any longer, or the number of active alternate routes in the route fan has dropped below a given number, does the routing system re-initialize said route fan.

The removal of the no longer available active alternate routes from the route fan has the effect of is filtering out the "poor" alternate routes. As a result, only very few calls are lost when distributing the overflow traffic occurring among all the alternate routes remaining in the route fan, in particular when there are unbalanced load situations in the network.

In practice, the load situation in the network is constantly changing, so that a routing system with a route fan of a fixed size will only rarely have an optimum distribution of the overflow traffic. By contrast, the routing system according to the invention quickly sets the size of the route fan to an optimum value and maintains it for a relatively long time.

This mode of operation is explained in more detail below with reference to FIG. 2.

FIG. 2 shows an excerpt from a fully intermeshed communication network with ten switching nodes, the excerpt showing the one-link direct route for traffic from the origin node 1 to the destination node 2 and all the two-link alternate routes of this origin-destination relationship via the transit nodes 3 to 10.

For the example in FIG. 2, just as in the case of FIG. 1, it is assumed that only two-link routes come into consideration as alternate routes.

In the example shown in FIG. 2 it shall be assumed that for some time there is unscheduled, greatly increased incoming traffic between the switching nodes 1 to 4 (network sector A), while there is normal, scheduled incoming traffic between the switching nodes 5 to 10 (network sector B) and between the switching nodes of sector A and sector B. Owing to the high level of incoming traffic within sector A, the links drawn in by dashed lines are seized virtually exclusively by direct-route traffic (on account of trunk reservation). As a result, the alternate routes via transit nodes 3 and 4 have a high blocking probability for the overflow traffic (for example 99%), while the six alternate routes which lead via the transit nodes 5 to 10 (drawn in by solid lines in FIG. 2) have altogether a very low blocking probability (for example 0.01%).

It is then again assumed that the route fan for the traffic from switching node 1 to switching node 2 of the example shown is initialized with the full route fan, i.e. with the eight alternate routes shown in FIG. 2. These alternate routes are offered the traffic overflowing from the direct route (1–2), or the overflowing calls. Since the blocking probability on the alternate routes via transit nodes 3 and 4 is significantly higher than on the alternate routes via transit nodes 5 to 10, the two highly loaded alternate routes are soon removed from the route fan. (With the blocking probabilities assumed above, a highly loaded alternate route is removed after the first assigned call in 99 out of 100 cases, while with one of the six alternate routes with low loading this happens only in one out of 10,000 cases.)

Since, according to this mode of operation, the route fan has been reduced to the alternate routes with low loading, the overflow traffic occurring is now equally distributed only among the six alternate routes with low loading, on the basis of a specific selection schema (randomly controlled or pseudorandomly controlled or cyclically rotating). The rise in the blocking probability caused by the assigned overflow traffic on the alternate routes is thus minimized.

The route fan is thus reduced very quickly to the optimum size and then becomes smaller only slowly.

If the network load considered in the example changes to the extent that an alternate route with previously low loading becomes highly loaded, it is soon removed from the route fan. If, conversely, an alternate route with previously high loading becomes an alternate route with low loading, after the next re-initialization the route fan quickly adjusts to the new optimum size.

By contrast to this, in processes which operate with route fans of a fixed size, the size of the fans cannot adapt to the changing unbalanced traffic loads in the network. As a result, a route fan of a fixed size often either contains alternate routes with high loading or does not contain all the alternate routes with low loading. In the first case, traffic is lost on the alternate routes with high loading. In the second case, the overflow traffic occurring is distributed unequally among the routes with low loading, so that in turn more traffic is lost than in the case of the process according to the invention.

If the route fan of an origin-destination relationship is re-initialized only when the number of alternate routes contained in it drops below a given number, the time constant of the filtering operation achieved by the no-replacement of an alternate route removed from the route fan can become quite long if there is little overflow traffic. By an additional re-initialization governed purely on a time basis (elapse of a specific period of time, for example 10–15 minutes, since the last re-initialization or periodic re-initialization, initiated by a network-centralized traffic management system taking into consideration the current load situation in the network), the possibility of such a long time constant can be avoided and the earlier re-inclusion in the route fan of alternate routes which have dropped out of the route fan but in the meantime have free capacity again due to changing of the network load can thus be achieved.

Furthermore, it is also possible for said network-centralized traffic management system to initiate a re-initialization of the route fans a periodically after identifying an unbalanced load situation in the network.

Finally, the network operator may also initiate an a periodic re-initialization.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A process for dynamic traffic control in a communication network, comprising the steps of:
   initially offering calls between an origin switching node of the communication network and a destination switching node of the communication network to at least one planned route;
   offering calls, in the event that none of the at least one planned route is available, to alternate routes, which are contained in a route fan, based on a predetermined selection scheme;
   removing an alternate route, previously contained in the route fan, from the route fan as soon as it is established that said alternate route is no longer available;
   reinitializing the route fan if the number of alternate routes contained in the route fan drops below a value;
   removal of the alternate route from the route fan not being restricted to an individual time for this alternate route; and
   reinitializing the route fan if a predetermined time condition is satisfied.

2. The process as claimed in claim 1, wherein the route fan is reinitialized in response to a command from a network-centralized traffic management system or a network operator.

3. The process as claimed in claim 1, wherein, during an initialization or re-initialization, the route fan is assigned all possible alternate routes.

4. The process as claimed in claim 1, wherein, during an initialization or re-initialization, the route fan is assigned a subset of possible alternate routes, which is determined based on one of a criterion of traffic loading or free capacity of the alternate routes by one of the origin switching node or a network-centralized traffic management system.

5. The process as claimed in claim 1, wherein a call is offered only to a single alternate route before the call is terminated because of non-availability of the single alternative route.

6. The process as claimed in claim 1, wherein a call is offered to a plurality of alternate routes before the call is terminated because of non-availability of the plurality of alternative routes.

7. The process as claimed in claim 1, wherein said predetermined selection scheme consists in that the alternate routes are selected from the route fan in one of a randomly controlled or pseudorandomly controlled or cyclically rotating manner.

8. The process as claimed in claim 1, wherein each alternate route selected from the route fan for overflow traffic is offered a given number of overflowing calls before moving on to a next alternate route according to the selection scheme.

9. A routing system for dynamic traffic control in a switching node processor of a communication network, the routing system having a structure comprising:
   the system offering calls between an origin switching node and a destination switching node of the communication network initially to at least one planned route;
   the system offering, in the event that none of the at least one planned route is available, calls to at least one alternate route, which are contained in a route fan, based on a specific selection scheme;
   the system removing the alternate route previously contained in the route fan from said route fan as soon as the alternate route is no longer available;
   the system reinitializing the route fan if the number of alternate routes contained in the route fan drops below a predetermined number;
   the system not restricting removal of an alternate route from the route fan to an individual time for this alternate route;
   also the system reinitializing the route fan if a predetermined time condition is satisfied.

10. The routing system as claimed in claim 9, wherein the system reinitializes the route fan in response to one of a command from a network-centralized traffic management system or a network operator.

11. The routing system as claimed in claim 9, wherein the system, during an initialization or reinitialization, assigns the route fan all possible alternate routes.

12. The routing system as claimed in claim 9, wherein the system, during an initialization or reinitialization, assigns the route fan a subset of possible alternate routes, which is determined based on a criterion of one of traffic loading or free capacity of the alternate routes by one of the routing system itself or a network-centralized traffic management system.

13. The routing system as claimed in claim 9, wherein the system offers a call to a single alternate route before the call is terminated in case of non-availability of the single alternative route.

14. The routing system as claimed in claim 9, wherein the system offers a call to a plurality of alternate routes before the call is terminated in case of non-availability of the plurality of alternative routes.

15. The routing system as claimed in claim 9, wherein said predetermined selection scheme consists in that the alternate routes are selected from the route fan in one of a randomly controlled or pseudorandomly controlled or cyclically rotating manner.

16. The routing system as claimed in claim 9, wherein the system offers each alternate route selected from the route fan for overflow traffic a given number of overflowing calls before the system offers the next alternate route according to the selection scheme.

* * * * *